United States Patent
Harris et al.

(10) Patent No.: US 7,213,092 B2
(45) Date of Patent: May 1, 2007

(54) WRITE RESPONSE SIGNALLING WITHIN A COMMUNICATION BUS

(75) Inventors: Antony John Harris, Sheffield (GB); Bruce James Mathewson, Cambridge (GB)

(73) Assignee: ARM Limited, Cambridge (GB)

( * ) Notice: Subject to any disclaimer, the term of this patent is extended or adjusted under 35 U.S.C. 154(b) by 199 days.

(21) Appl. No.: 10/862,900

(22) Filed: Jun. 8, 2004

(65) Prior Publication Data

US 2005/0273537 A1    Dec. 8, 2005

(51) Int. Cl.
*G06F 13/00*   (2006.01)
*G06F 3/00*    (2006.01)

(52) U.S. Cl. .................................. 710/110; 710/52

(58) Field of Classification Search ........ 710/100–125, 710/300–317, 52
See application file for complete search history.

(56) References Cited

U.S. PATENT DOCUMENTS

| | | | |
|---|---|---|---|
| 5,699,367 A * | 12/1997 | Haartsen | 714/749 |
| 6,021,516 A * | 2/2000 | Okajima et al. | 714/748 |
| 6,353,867 B1 * | 3/2002 | Qureshi et al. | 710/305 |
| 6,415,365 B1 * | 7/2002 | Flynn | 711/156 |
| 6,496,905 B1 * | 12/2002 | Yoshioka et al. | 711/154 |
| 6,691,200 B1 * | 2/2004 | Zhou et al. | 710/314 |
| 6,816,938 B2 * | 11/2004 | Edara et al. | 710/305 |
| 6,851,056 B2 * | 2/2005 | Evans et al. | 713/193 |
| 2002/0062414 A1 * | 5/2002 | Hofmann et al. | 710/110 |
| 2002/0184453 A1 * | 12/2002 | Hughes et al. | 711/150 |
| 2004/0215893 A1 * | 10/2004 | Emerson et al. | 711/138 |
| 2005/0165597 A1 * | 7/2005 | Nightingale | 703/27 |
| 2006/0010280 A1 * | 1/2006 | Chalopin et al. | 710/315 |

OTHER PUBLICATIONS

VSI Alliance, "Virtual Component Interface Standard", Apr. 2001, Version 2.0, pp. 7-56 and 81-82.*

* cited by examiner

*Primary Examiner*—Mark H. Rinehart
*Assistant Examiner*—Faisal Zaman
(74) *Attorney, Agent, or Firm*—Nixon & Vanderhye P.C.

(57) ABSTRACT

An integrated circuit 2 is provided with multiple bus masters 4, 6 and multiple bus slaves 8, 10, 12, communicating via a multi-channel communication bus. A separate write data channel, read data channel and write response channel are provided as well as a separate write address channel and a read address channel. The provision of a dedicated write response channel frees the read data channel to be more efficiently used for the transfer of read data. Transactions may be burst mode transactions with a single write response corresponding to the write transaction as a whole.

14 Claims, 2 Drawing Sheets

WRITE RESPONSE SIGNALLING WITHIN A COMMUNICATION BUS

BACKGROUND OF THE INVENTION

1. Field of the Invention

This invention relates to the field of data processing systems. More particularly, this invention relates to data processing systems in which a communication bus is used to transfer write transactions between a bus master and a bus slave and also to pass write responses from the bus slave back to the bus master.

2. Description of the Prior Art

It is known within the field of communication buses for data processing systems, such as integrated circuit system-on-chip designs, to provide communication buses via which write transactions can be made from a bus master to a bus slave. In some circumstances it is desirable that a write response be passed back to the bus master to indicate whether the write transaction was successfully completed by the bus slave. In the known Virtual Component Interface ("VCI") bus system there are provided a separate write data channel and read data channel using which write transactions and read transactions are respectively performed. The read data channel is also used to pass write response signals corresponding to the outcome of a write transaction on the write data channel back to the originating bus master.

It is also known within the field of data processing in general to provide multiple logical channels, such as by time division multiplexing or code division multiplexing, upon a single communication channel to enable different respective signals to be transferred. This type of arrangement is generally considered desirable since the number of communication channels, such as telecommunication frequencies, is limited and accordingly it is advantageous to multiplex together many communication channels.

SUMMARY OF THE INVENTION

Viewed from one aspect the present invention provides apparatus for processing data, said apparatus comprising:

at least one bus master operable to generate data access transactions;

at least one bus slave operable to receive said data access transactions; and a communication bus coupling said at least one bus master to said at least one bus slave, data access transactions passing via said communication bus between said at least one bus master and said at least one bus slave; wherein said communication bus has separate signal lines providing respective independently and concurrently operable communication channels including:

(i) a write data channel operable to transfer write data from said at least one bus master to said at least one bus slave;

(ii) a read data channel operable to transfer read data from said at least one bus slave to said at least one bus master; and (iii) a write response channel operable to transfer a write response indicative of an outcome of a write transaction from said at least one bus slave to said at least one bus master.

The present technique recognizes that in some contexts it can be advantageous to separately provide a write data channel, a read data channel and a write response channel. These separate channels independently and concurrently operate to pass their respective signals between the bus masters and bus slaves. Separating the write response out from the read data channel avoids the situation whereby the need to pass write response signals inhibits the ability to pass read data signals. Particularly difficult circumstances can arise when there are a large number of write transactions as each response requires sharing the read data channel, then the write responses can significantly impact the read data performance. Furthermore, it is normally the read data performance which is most critical in overall system performance. The separate provision of the write response channel imposes a small additional circuit complexity overhead but otherwise allows more efficient use to be made of the read data channel. More particularly, the read data channel will typically be a wide multi-bit channel of which only a few lines are used to pass a relatively simple write response. The passing of the write response nevertheless consumes an entire read data bus cycle. The resources of the read data channel are more efficiently employed in transferring wide read data signals and accordingly the additional overhead of providing a write response channel, which need only be relatively narrow is more than justified.

In preferred embodiments it is advantageous to use burst mode write transfers in which a single address is transferred using the address channel to specify a sequence of memory locations to which multiple write data words are to be written. In this context, it is advantageous if a single write response is returned in respect of a burst mode write transfer as a whole rather than returning a separate write response for each write data word of that burst mode write transfer. The loss of the ability to isolate an individual write data word which can have resulted in an incomplete operation as identified by an individual write response, is more than compensated for by the release of bandwidth on the write response channel such that multiple pending write transactions do not restrict one another.

Whilst it will be appreciated that a single address channel may be provided in respect of both write transactions and read transactions, in preferred embodiments a separate write address channel and a separate read address channel are provided.

The independent and concurrent operation of the respective communication channels within the communication bus is enhanced when these include respective separate handshaking signals.

It will be appreciated that write transactions can be bufferable or non-bufferable. Bufferable transactions are ones in which the write transaction may be subject to an optional buffering delay. Non-Bufferable transactions are ones in which the transaction should be completed as quickly as possible without the use of any optional buffering delay.

In some embodiments it is desirable to provide write responses in respect of both bufferable and non-bufferable write transactions as this enables a simplified communication bus infrastructure design and devolves responsibility for the handling of the bufferable/non-bufferable status of such write transactions onto the bus masters and bus slaves. Alternatively, it is also possible that write responses may only be provided in respect of non-bufferable write transactions.

In preferred embodiments the address channel includes a signal specifying whether a write transaction is a bufferable write transaction or a non-bufferable write transaction.

Whilst it will be appreciated that the bus masters and bus slaves may be directly connected together in one-to-one, one-to-many or many-to-one configurations, in preferred embodiments one or more bus interconnect circuits are disposed within the communication bus between the bus masters and the bus slaves. The provision of bus interconnect circuits provides a better degree of scalability and performance within the bus connection mechanism as a whole.

Viewed from another aspect the present invention provides a method of processing data, said method comprising the steps of:

generating data access transactions with at least one bus master;

receive said data access transactions with at least one bus slave; and coupling said at least one bus master to said at least one bus slave with a communication bus, data access transactions passing via said communication bus between said at least one bus master and said at least one bus slave; wherein said communication bus has separate signal lines providing respective independently and concurrently operable communication channels including:

(i) a write data channel operable to transfer write data from said at least one bus master to said at least one bus slave;

(ii) a read data channel operable to transfer read data from said at least one bus slave to said at least one bus master; and (iii) a write response channel operable to transfer a write response indicative of an outcome of a write transaction from said at least one bus slave to said at least one bus master.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
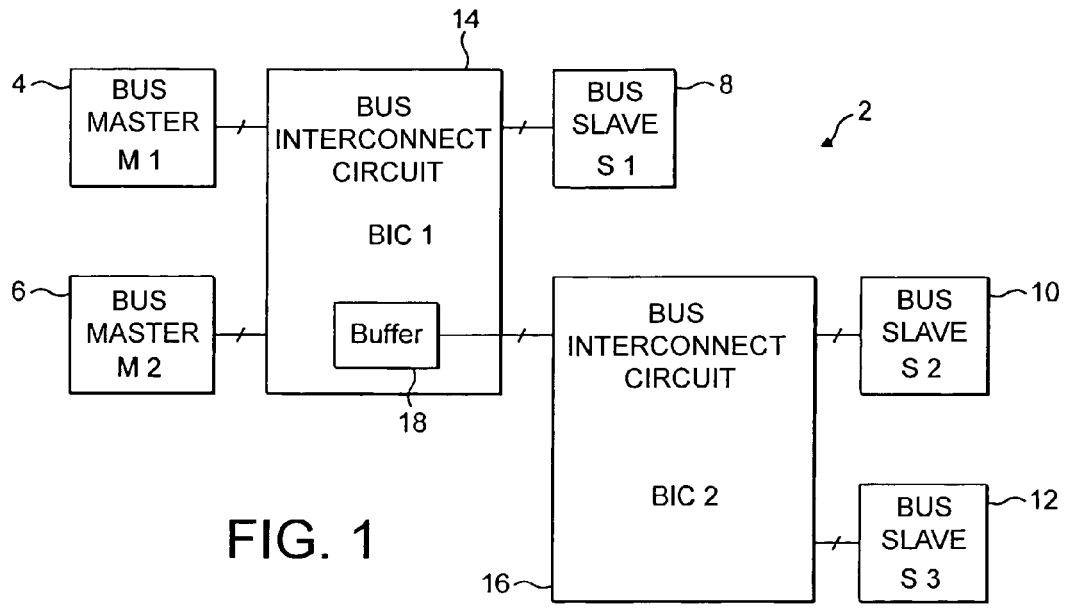
FIG. 1 schematically illustrates an integrated circuit system-on-chip design including multiple bus masters, multiple bus interconnect circuits and multiple bus slaves.

FIG. 1 illustrates an integrated circuit 2 carrying a system-on-chip design formed of multiple bus masters 4, 6, multiple bus slaves 8, 10, 12 and multiple bus interconnect circuits 14, 16. These circuit elements 4–16 are linked together and communicate via communication buses which share a common bus protocol. A bus master 4, 6 initiates a write transaction or a read transaction which is then communicated via the communication buses, and any intervening bus interface circuit 14, 16, to the target bus slave device 8, 10, 12. The target bus slave device 8, 10, 12 responds to that transaction by either making the write requested or returning the read data requested. As illustrated, the bus connections are pipelined and can include multiple stages of delay, which can vary depending upon the path followed. The bus interconnect circuit 14 also includes a write buffer 18, which may optionally be used in respect of write transactions which are indicated as being bufferable.

Figure 2:
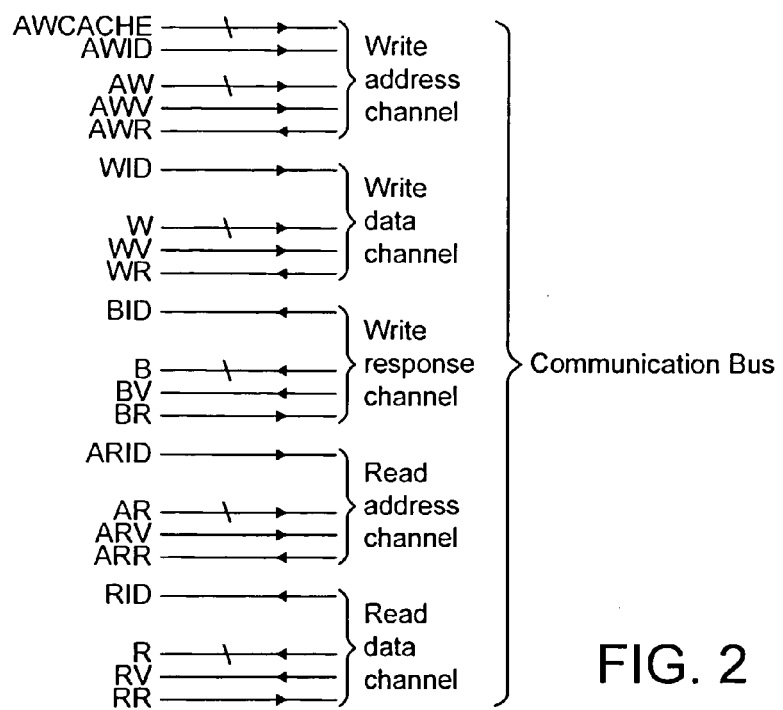
FIG. 2 schematically illustrates a communication bus having multiple communication channels.

FIG. 2 illustrates the communication bus used in more detail. In particular, this bus includes independent and concurrently operable write address, write data, write response, read address and read data channels. These different channels are provided with transaction identifying signals AWID, WID, BID, ARID and RID which enable transactions to be identified independently of the address signals concerned. This enables an advantageous degree of independence in the timing and ordering of the transfer of the different signals which make up the transaction as a whole. As an example, write data may proceed the write address in its transfer from the bus master to the bus slave. When the write address eventually moves to the bus slave, the write may be made. Furthermore, different burst mode transactions may be interleaved to make better use of the bus bandwidth available. The management of the transfer of signals via the respective channels is improved by the provision of respective handshaking signals in the form of valid and ready signals such as AWV and AWR, for the write address channel. The valid signal indicates when valid signals are being asserted on that channel and the ready signal indicates when these signals have been received.

As illustrated in FIG. 2, a communication bus includes a write response channel which passes a multi-bit write response signal B from the bus slaves 8, 10, 12 back to the originating bus master 4, 6. These write response signals indicate various possible write response types such as normal access success, exclusive access success, slave error or decode error. Different or additional write responses are also possible. A write response will not normally be available until the write has actually been made and accordingly it is known whether or not the write was or was not successful. However, in some embodiments, it is possible that the write response may be assumed and returned by some intermediate circuit even though the actual write has not yet been made. This introduces the possibility of a write failing even though it has been indicated as being successful, but the performance advantages of the earlier response may outweigh this potential problem and in some circumstances the failure of a write may not be significant.

Figure 3:
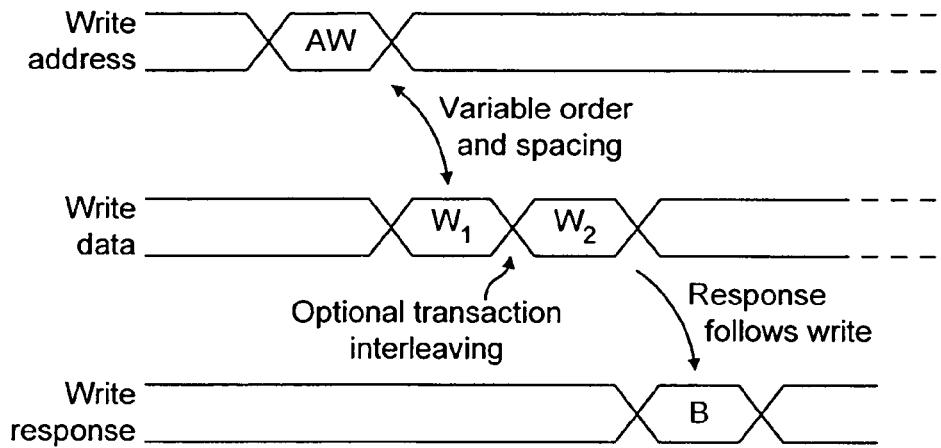
FIG. 3 schematically illustrates the relationship of address, data and response signals making up a write transaction.

FIG. 3 schematically illustrates various signals making a write transaction. On the write address channel, a write address signal AW from a burst mode transaction is passed from a bus master 4, 6 to a bus slave 8, 10, 12. The corresponding multi-word burst of write data $W_1$, $W_2$ is passed by the write data channel. (It will be appreciated that the write data may be issued from the bus master 4, 6 in advance of the write address or following the write address.) The relative ordering of the address and data may also vary as they are transmitted through the bus infrastructure and subject to differing delays via their respective different paths and as influenced by other concurrently active bus transactions. It is also desirable that the write data should be capable of being interleaved with write data from another transaction as a way of improving utilization of the write data channel. The transaction ID signals discussed in relation to FIG. 2 serve to enable these individual elements of write data to be correlated with their respective transactions when they are received at the bus slave 8, 10, 12. The transaction IDs can also be used to correlate corresponding write responses. As illustrated in FIG. 3, following the writing of the data at the bus slave 8, 10, 12, the bus slave returns a write response signal B to the bus master 4, 6. This write response signal B passes by the independent and concurrently operable write response channel. The response B follows the write, but could be delayed or otherwise spaced therefrom. The transaction ID associated with the write response can be used to match the write response to the write transaction concerned.

Figure 4:
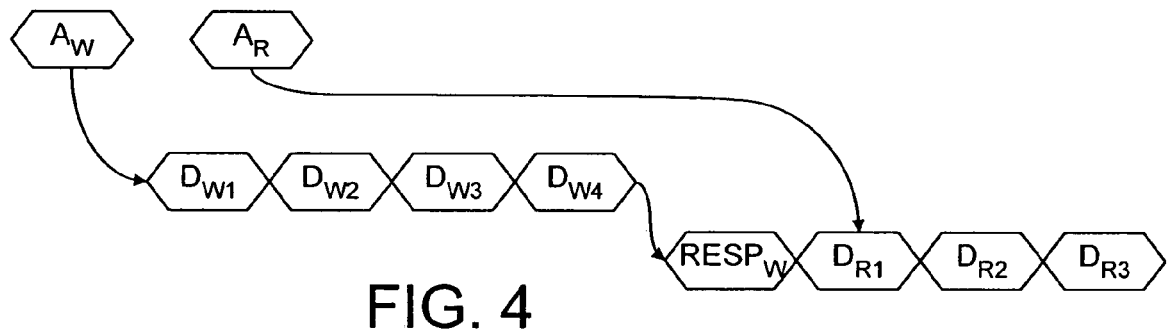
FIGS. 4 and 5 schematically illustrate a comparison between a system in which read data and write responses are both passed by the read data channel and a system in which the read data and write responses are passed by separate channels.

FIG. 4 illustrates a problem which can arise in systems not using separate write response channels and read data channels. In particular, a write transaction to a write address $A_W$ comprises multiple write data words $D_{W1}$ to $D_{W4}$. Following this, a read transaction is initiated to a read address $A_R$. In this example, the address channel is shared between the read transactions and the write transactions. It is also possible that these may have separate address buses. In the example illustrated, the write response $RESP_W$ is returned via the read address channel and accordingly the return of the read data $D_{R1}$ to $D_{R3}$ is delayed behind this response. This introduces a disadvantageous delay in the return of the read data, which is often highly performance critical. Also, the bandwidth associated with the read data is reduced by the need to also use this bandwidth to pass the write response signals.

Figure 5:
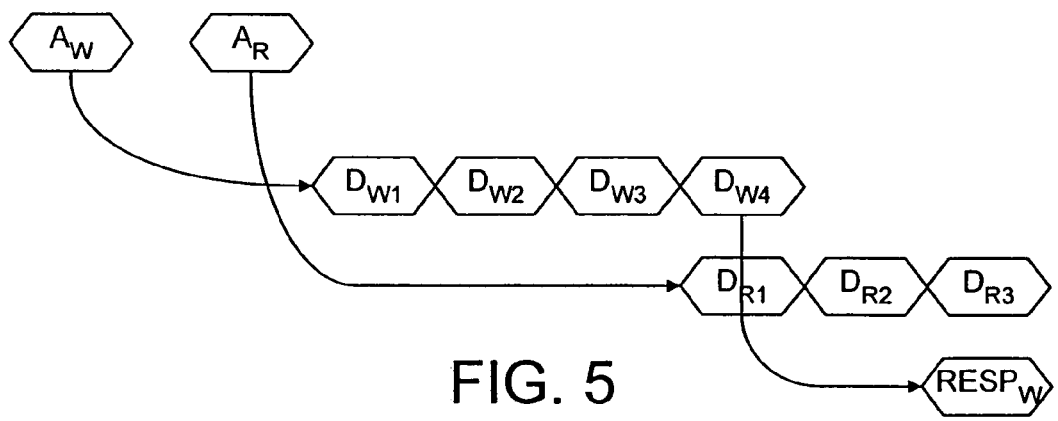

FIG. 5 illustrates the same sequence of a write transaction followed by a read transaction, but in this case the write response $RESP_W$ is returned on the separate, independent and concurrently operating write response channel. In this way, the read data $D_{R1}$ to $D_{R3}$ is not held up behind the write response $RESP_W$ and is returned to the requesting bus master 4, 6 more rapidly.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
    at least one bus master operable to generate data access transactions;
    at least one bus slave operable to receive said data access transactions; and
    a communication bus coupling said at least one bus master to said at least one bus slave, data access transactions passing via said communication bus between said at least one bus master and said at least one bus slave; wherein
    said communication bus has separate signal lines providing respective independently and concurrently operable communication channels including:
        (i) a write data channel operable to transfer write data from said at least one bus master to said at least one bus slave;
        (ii) a read data channel operable to transfer read data from said at least one bus slave to said at least one bus master; and
        (iii) a write response channel operable to transfer a write response indicative of an outcome of a write transaction from said at least one bus slave to said at least one bus master, wherein a write transaction issued from a bus master is one of a bufferable write transaction subject to an optional buffering delay: and a non-bufferable write transaction not subject to any optional buffering delay, wherein said write response channel transfers write responses in respect of only non-bufferable write transactions.

2. Apparatus as claimed in claim 1, wherein said communication bus includes an address channel operable to transfer an address from said at least one bus master to said at least one bus slave.

3. Apparatus as claimed in claim 2, wherein said address channel and said write data channel are operable in a burst mode to perform a burst mode write transfer in which a write address transferred by said address channel specifies a start address for a sequence of write accesses corresponding to a plurality of write data transfers via said write data channel and said write response channel transfers a combined write response for said burst mode write transfer as a whole.

4. Apparatus as claimed in claim 2, wherein said communication bus includes a write address channel and a read address channel.

5. Apparatus as claimed in claim 1, wherein said communication channels include respective separate handshaking signals.

6. Apparatus as claimed in claim 1, wherein said communication bus includes a write address channel operable to transfer a write address from said at least one bus master to said at least one bus slave and said write address channel includes a signal specifying whether a write transaction is a bufferable write transaction or a non-bufferable write transaction.

7. Apparatus as claimed in claim 1, wherein one or more bus interconnect circuits is disposed within said communication bus between said at least one bus master and said at least one bus slave.

8. A method of processing data, said method comprising the steps of:
    generating data access transactions with at least one bus master;
    receiving said data access transactions with at least one bus slave; and
    coupling said at least one bus master to said at least one bus slave with a communication bus, data access transactions passing via said communication bus between said at least one bus master and said at least one bus slave; wherein said communication bus has separate signal lines providing respective independently and concurrently operable communication channels including:
        (i) a write data channel operable to transfer write data from said at least one bus master to said at least one bus slave;
        (ii) a read data channel operable to transfer read data from said at least one bus slave to said at least one bus master; and
        (iii) a write response channel operable to transfer a write response indicative of an outcome of a write transaction from said at least one bus slave to said at least one bus masters wherein a write transaction issued from a bus master is one of a bufferable write transaction subject to an optional buffering delay: and a non-bufferable write transaction not subject to any optional buffering delay, wherein said write response channel transfers write responses in respect of only non-bufferable write transactions.

9. A method as claimed in claim 8, wherein said communication bus includes an address channel operable to transfer an address from said at least one bus master to said at least one bus slave.

10. A method as claimed in claim 9, wherein said address channel and said write data channel are operable in a burst mode to perform a burst mode write transfer in which a write address transferred by said address channel specifies a start address for a sequence of write accesses corresponding to a plurality of write data transfers via said write data channel and said write response channel transfers a combined write response for said burst mode write transfer as a whole.

11. A method as claimed in claim 9, wherein said communication bus includes a write address channel and a read address channel.

12. A method as claimed in claim 8, wherein said communication channels include respective separate handshaking signals.

13. A method as claimed in claim 8, wherein said communication bus includes a write address channel operable to transfer a write address from said at least one bus master to said at least one bus slave and said write address channel includes a signal specifying whether a write transaction is a bufferable write transaction or a non-bufferable write transaction.

14. A method as claimed in claim 8, wherein one or more bus interconnect circuits is disposed within said communication bus between said at least one bus master and said at least one bus slave.

* * * * *